United States Patent
Williamson et al.

(10) Patent No.: US 8,869,671 B2
(45) Date of Patent: Oct. 28, 2014

(54) AIRCRAFT DEVICE DEPLOYMENT SYSTEM WITH SPRING-DRIVEN MECHANICAL LINKAGE

(75) Inventors: Zachary Williamson, Tucson, AZ (US); Jeffrey H. Koessler, Tucson, AZ (US); Paul A. Merems, Tucson, AZ (US); Timothy A. Murphy, Tucson, AZ (US); Dennis E. Rossmeier, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 38 days.

(21) Appl. No.: 13/585,245

(22) Filed: Aug. 14, 2012

(65) Prior Publication Data

US 2014/0048654 A1    Feb. 20, 2014

(51) Int. Cl.
B64D 1/04    (2006.01)

(52) U.S. Cl.
USPC .......................................... 89/1.54; 244/137.4

(58) Field of Classification Search
USPC ............. 244/137.4; 89/1.51, 1.54, 1.58, 1.59; 102/382
See application file for complete search history.

(56) References Cited

U.S. PATENT DOCUMENTS

| | | | | |
|---|---|---|---|---|
| 2,756,091 A * | 7/1956 | Komerska | .................. | 294/82.26 |
| 3,598,341 A * | 8/1971 | La Roe et al. | .............. | 244/118.1 |
| 3,799,478 A * | 3/1974 | Costes et al. | .............. | 244/137.4 |
| 3,883,097 A * | 5/1975 | Billot | .......................... | 244/137.4 |
| 3,954,233 A * | 5/1976 | Hasquenoph et al. | ..... | 244/137.4 |
| 4,008,645 A * | 2/1977 | Herbert | .......................... | 89/1.51 |
| 4,049,222 A * | 9/1977 | Peterson | .................... | 244/137.4 |
| 4,050,656 A * | 9/1977 | Peterson | .................... | 244/137.4 |
| 4,129,271 A * | 12/1978 | Hasquenoph et al. | ..... | 244/137.4 |
| 4,168,047 A * | 9/1979 | Hasquenoph et al. | ..... | 244/137.4 |
| 4,257,639 A * | 3/1981 | Stock | .......................... | 294/82.26 |
| 4,388,853 A * | 6/1983 | Griffin et al. | .................. | 89/1.57 |
| 4,412,475 A | 11/1983 | Hornby | | |
| 4,520,711 A * | 6/1985 | Robinson | ...................... | 89/1.55 |
| 4,606,517 A * | 8/1986 | Adams | ........................ | 244/137.4 |
| 4,632,338 A * | 12/1986 | Hasquenoph et al. | ..... | 244/137.4 |
| 4,669,356 A * | 6/1987 | Griffin et al. | .................. | 89/1.57 |
| 4,987,820 A * | 1/1991 | Gordon | .......................... | 89/1.55 |
| 5,092,774 A | 3/1992 | Milan | | |
| 5,651,683 A | 7/1997 | Shimamura et al. | | |
| 5,907,118 A * | 5/1999 | Jakubowski et al. | .......... | 89/1.51 |
| 6,250,195 B1 * | 6/2001 | Mendoza et al. | ............. | 89/1.59 |
| 6,466,044 B1 | 10/2002 | Smith | | |
| 6,481,669 B1 * | 11/2002 | Griffin | ........................ | 244/137.4 |
| 6,679,154 B1 * | 1/2004 | Paul | .............................. | 89/1.806 |
| 6,705,571 B2 * | 3/2004 | Shay et al. | .................. | 244/137.1 |
| 6,811,123 B1 * | 11/2004 | Foster et al. | ................ | 244/137.4 |
| 6,851,647 B1 | 2/2005 | Rosenbaum et al. | | |
| 6,948,685 B2 * | 9/2005 | Hawthorne | ................ | 244/129.1 |
| 7,059,882 B2 | 6/2006 | Sugita et al. | | |
| 7,083,148 B2 * | 8/2006 | Bajuyo et al. | .............. | 244/137.4 |
| 7,232,092 B2 | 6/2007 | Yamamoto | | |

(Continued)

Primary Examiner — Benjamin P Lee
(74) Attorney, Agent, or Firm — Renner, Otto, Boisselle & Sklar, LLP

(57) ABSTRACT

A deployment system includes a spring-driven linkage for deploying one or more kicker feet, to push a device to be deployed away from the deployment system. The kicker feet may include fore and aft kicker feet that push the deployed device to obtain a desire pitch in the launch, an example being a minimal or substantially zero pitch. The release of the kicker feet may be controlled by a pair of actuator, such as electrical solenoid actuators, both of which must be actuated to deploy the device. An electrical connection may allow positional float to account for tolerances in the positioning of the device relative to the deployment system.

19 Claims, 3 Drawing Sheets

(56) References Cited

U.S. PATENT DOCUMENTS

| | | | |
|---|---|---|---|
| 7,845,263 B1* | 12/2010 | Miller | 89/1.56 |
| 7,946,208 B1* | 5/2011 | Howard et al. | 89/1.57 |
| 2002/0088902 A1* | 7/2002 | Griffin | 244/137.4 |
| 2006/0108478 A1* | 5/2006 | Bajuyo et al. | 244/137.4 |
| 2007/0025809 A1 | 2/2007 | Lee et al. | |
| 2008/0203220 A1 | 8/2008 | Hanzlick et al. | |
| 2008/0270664 A1 | 10/2008 | Carnevali | |
| 2012/0108094 A1 | 5/2012 | Murphy et al. | |

* cited by examiner

AIRCRAFT DEVICE DEPLOYMENT SYSTEM WITH SPRING-DRIVEN MECHANICAL LINKAGE

BACKGROUND OF THE INVENTION

1. Field of the Invention

The invention is in the field of deployment systems for deploying devices, for example munitions, from vehicles such as aircraft.

2. Description of the Related Art

Launch systems have been used for deploying larger munitions, but no standard system has been developed for deploying small munitions. Small munitions present different problems than large munitions in development of cost-effective delivery system.

SUMMARY OF THE INVENTION

A device deployment system has a spring-driven linkage used to push the device away from the deployment system.

A device deployment system has a pair of longitudinally-separated kicker feet that push the device away with a desired pitch. The desire pitch may be a minimal pitch.

A device deployment system includes an electrical connector that positionally floats relative to a body of the system.

According to an aspect of the invention, a deployment system for deploying a device from an aircraft during flight, includes: a pair of kicker feet; a spring-driven mechanical linkage operatively coupled to the kicker feet; and a release lug that selectively secures the device to the deployment system, wherein releasing the release lug causes the linkage to push the kicker feet contacting the device, and pushing the device away from the deployment system.

According to another aspect of the invention, a deployment system for deploying a device from an aircraft during flight, includes: a body; a release lug at least partially within the body, wherein the release lug selectively secures the device to the deployment system; a floating electrical connector, wherein the floating electrical connector is mechanically coupled to a block that is fixedly attached to the body, and positionally floats relative to the block; and spring pins between the connector and the block, wherein the spring pins a positive positioning force that limits movement of the floating electrical connector from vibrations.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A deployment system includes a spring-driven linkage for deploying one or more kicker feet, to push a device to be deployed away from the deployment system. The kicker feet may include fore and aft kicker feet that push the deployed device to obtain a desire pitch in the launch, an example being a minimal or substantially zero pitch. The release of the kicker feet may be controlled by a pair of actuator, such as electrical solenoid actuators, both of which must be actuated to deploy the device. An electrical connection may allow positional float to account for tolerances in the positioning of the device relative to the deployment system.

Figure 1:
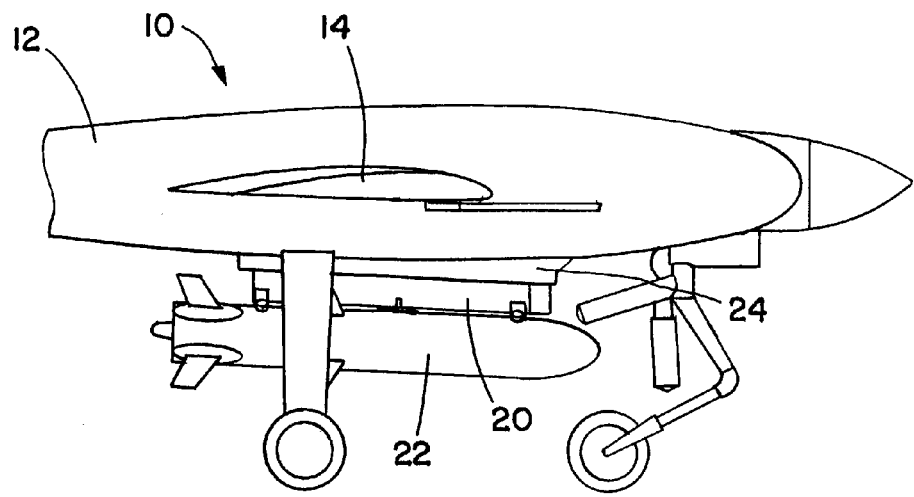
FIG. 1 is a side view of an aircraft carrying a deployment system in accordance with the invention.

FIG. 1 shows an aircraft (air vehicle) 10. The aircraft 10 may be an unmanned aerial vehicle (UAV), a drone aircraft used for surveillance and/or targets. The aircraft 10 may have conventional aircraft features, such as a fuselage 12, wings or other lift-producing surfaces 14, control surfaces, guidance systems, communication systems, and the like.

A deployment system 20 is used to deploy a device 22 from the aircraft 10. In the illustrated embodiment the deployment system 20 is secured to a wing spar 24 of the aircraft 10, although alternatively the deployment system 20 may be secured to another part of the aircraft 10, such as to the underside of the fuselage 12. The deployment system 20 provides a releasable mechanical securement of the device 22 to the aircraft 10. This allows the device 22 to be selectively deployed at a desired time during flight of the aircraft 10. In addition to providing separable mechanical securement of the device 22, the deployment system 20 may also provide an electrical connection between the aircraft 10 and the device 22, as will be described in greater detail below.

The device 22 may be configured to receive any of a variety of small munitions, with "small munitions" being defined as a munition with a mass of 45 kg or less (a weight of 100 lbs or less). Alternatively, the munition may have a mass of 23 kg of less (a weight of 50 lbs or less), or a mass of 11 kg or less (a weight of 25 lbs or less). The device 22 may alternatively any of a variety of be other types of devices, for example sonar buoys, weather measurement devices, or other types of equipment and/or supplies.

Figure 2:
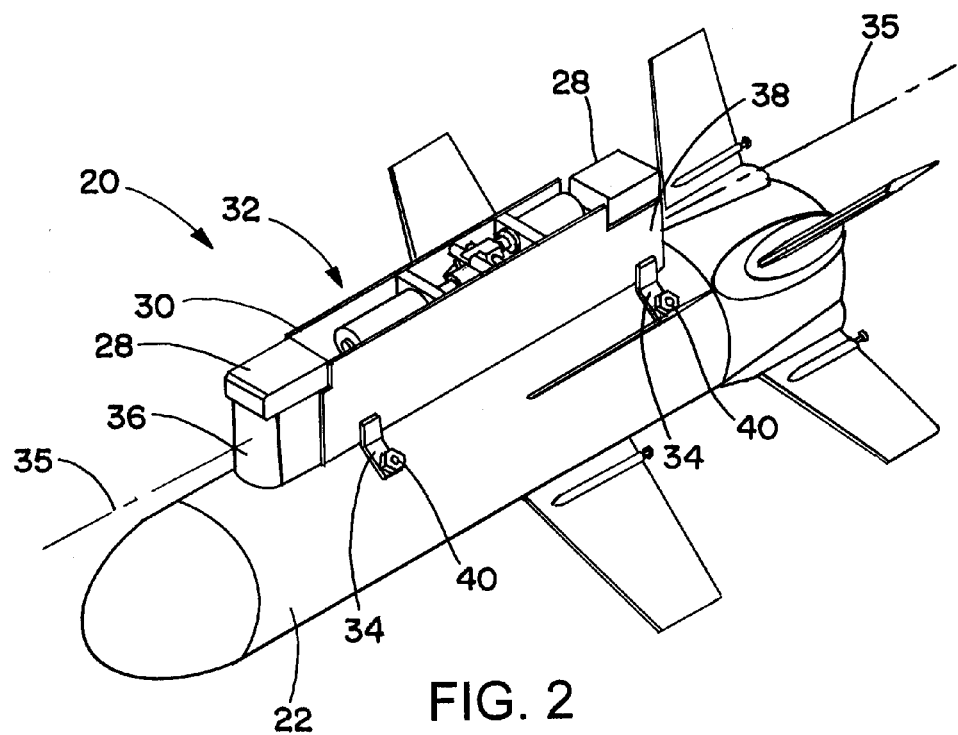
FIG. 2 is an oblique view of the deployment system and the device to be deployed, as part of the embodiment of FIG. 1.

FIG. 2 shows further details of the engagement between the deployment system 20 and the device 22 that is deployed. The deployment system 20 may be secured to the aircraft 10 (FIG. 1) using mounting blocks 28 or the like. The deployment system 20 has a body 30 that includes within it a mechanism 32, described in detail below, for holding and releasing the device 22. In addition, the deployment system 20 has arms 34 that extend out from a centerline 35 (in actuality, a center plane) of the body 30 that may be substantially parallel to a longitudinal axis of the fuselage 12 (FIG. 1) of the aircraft 10 (FIG. 1). More generally the centerline 35 of the body 30 may be within a longitudinally-oriented plane of symmetry about the mounting of the deployment system 20 to the aircraft 10. The centerline 35 of the body extends in a direction from a forward end (front) 36 of the body 30, to an aft end (back) 38 of the body 30. In the illustrated embodiment there are two of the arms 34 on each side of the centerline 35. The arms 34 angle downward, toward the device 22 and away from the aircraft 10, with increasing distance from the body 30. The arms 34 have adjustable screws of bolts 40 threaded into them. The positions of the screws or bolts 40 may be individually adjusted by screwing them in or out. The bolts 40 press against the sides of the device 22, preventing swaying of the device 22 while it is secured to the deployment system 20.

Figure 3:
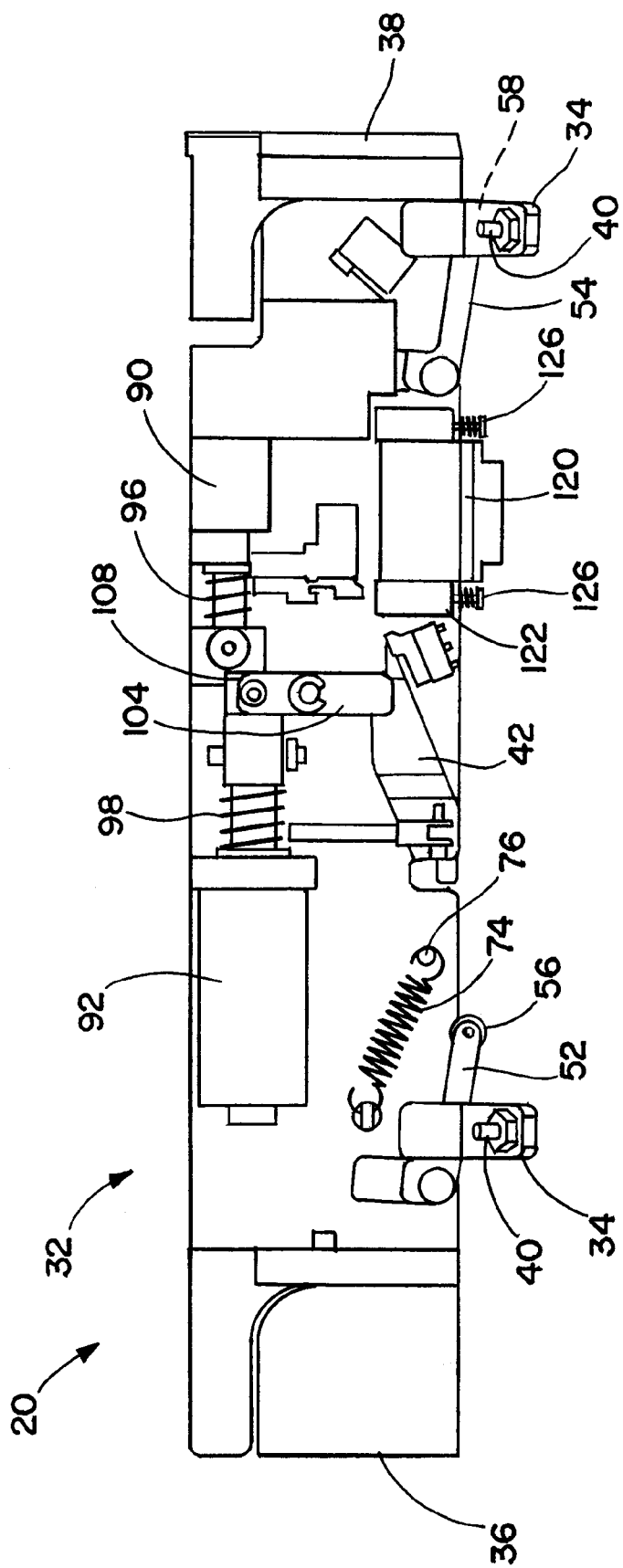
FIG. 3 is a side view of the deployment system of FIG. 1.
Figure 4:
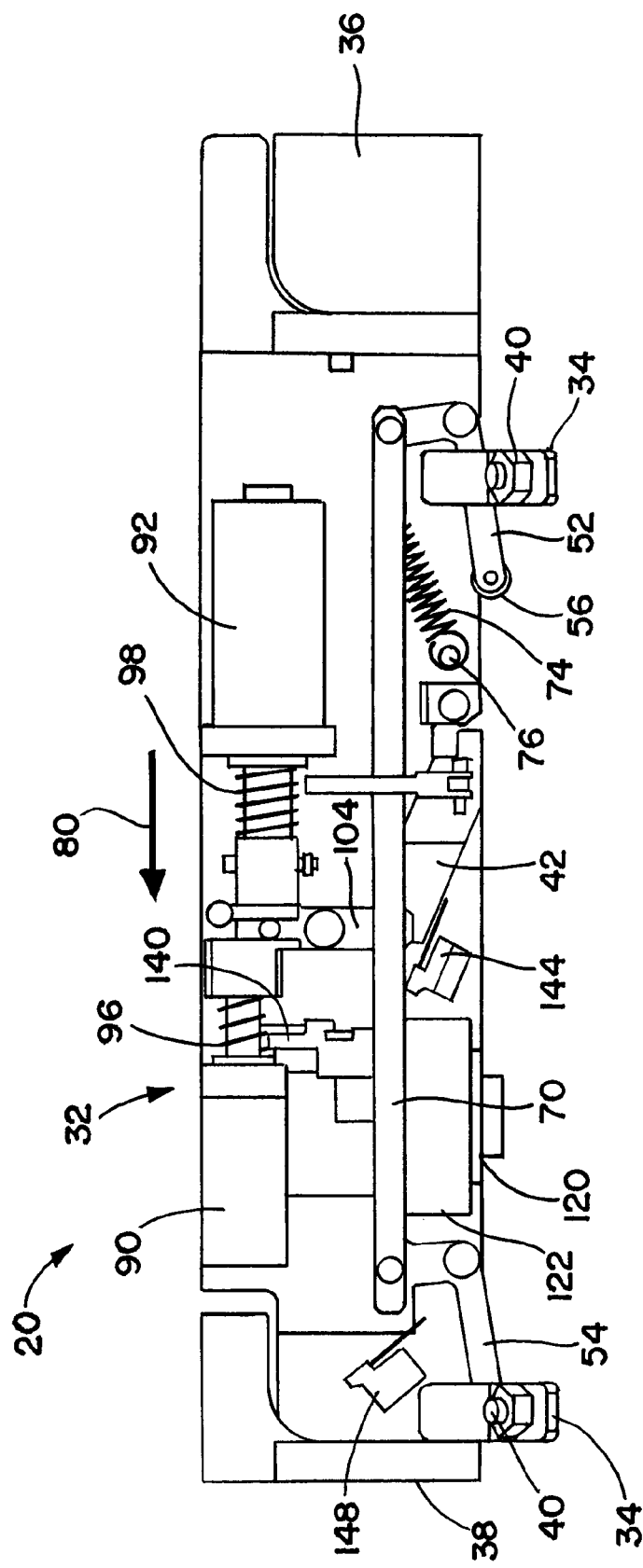
FIG. 4 is another side view of the deployment system of FIG. 1.

Referring now to FIGS. 3 and 4, details are now explained for the mechanism 32. The mechanism 32 includes a release lug 42 that engages a corresponding attachment lug (not shown) on the device 22 (FIG. 2). The release lug 42 rotates to get out of engagement with the device's attachment lug, to release the device 22 from the deployment system 20.

The mechanism 32 also includes a forward kicker foot 52 and an aft kicker foot 54, both used for pushing the device 22 (FIG. 2) away from the deployment system 20 as the device 22 is released. The kicker feet 52 and 54 have respective rollers 56 and 58 on their ends that contact the surface of the device 22. The rollers 56 and 58 may be made of a suitable non-metallic material, for example a suitable plastic such as a plastic sold under the trademark DELRIN.

The kicker feet 52 and 54 are L-shaped members that rotate about central points 62 and 64 where the kicker feet 52 and 54 are rotatably coupled to the deployment system body 30. The kicker feet 52 and 54 are separated longitudinally from one another, in the direction of the centerline 35. On the other ends of the kicker feet 52 and 54 (the ends opposite the rollers 56 and 58), the kicker feet 52 and 54 are connected to a link bar 70. The link bar 70 controls rotation of both of the kicker 52 and 54. The link bar 70 rotates and pushes out the roller ends of the kicker feet 52 and 54 substantially simultaneously when the release lug 42 is released. This pushes the device 22 (FIG. 2) away from the deployment system 20 introducing pitch into the released device 22. In many instances it is desirable to avoid introducing pitch when releasing the device 22, because pitch can cause undesirable course deviations in munitions and other devices. More broadly, however, the mechanism 32 may be used to deploy the kicker feet 52 and 54 to achieve desired pitch characteristics in the deployment of the device 22. The desired pitch characteristics may be no pitch at all (or a minimum amount), or a desired amount of nose-up or nose-down pitch, for instance to achieve a safe separation, based on requirements from separation dynamics.

A kicker spring 74 is coupled to a cross pin 76 on the body 30, and to the link bar 70. The kicker spring 74 provides the force for moving the link bar 70 aft (in an aft longitudinal direction 80), to cause the kicker feet 52 and 54 to rotate out and push the device 22 away from the deployment system 20.

A pair of actuators 90 and 92 control release of the release lug 42, and thereby control separation of the device 22 (FIG. 2). In the illustrated embodiment both of the actuators 90 and 92 are electrical linear solenoid actuators that compress (pull) when activated. However, other types of actuators, such as hydraulic actuators, may be used as alternatives. The actuators 90 and 92 pull against respective actuator springs 96 and 98 that surround parts of the actuators 90 and 92. The actuator springs 96 and 98 bias the actuators 90 and 92 in their extended positions. In the extended positions the actuators 90 and 92 prevent rotation of a release latch 104, which in turn prevents the release lug 42 from disengaging from the corresponding attachment lug of the device 22. The secondary actuator 90 and the primary actuator 92 provide a redundant locking mechanism, such that both of the actuators 90 and 92 must be retracted to allow the release lug 42 to disengage from the attachment lug.

The secondary actuator 90 includes a tooth 108 that fits into the release latch 104, and prevents the release latch 104. Activation (contraction in the illustrated embodiment) of the primary actuator 92 causes rotation of the release latch 104, which allows the release lug 42 to disengage from the attachment lug on the device (FIG. 2).

The deployment system 20 also includes a floating umbilical electrical connector 120 that is able to positionally float to some degree with respect to the deployment system body 30. A block 122 is secured to body 30, and the electrical connector 120 is located within the block 122, and able to positionally float within the block 122. The positional float of the electrical connector 120 allows compensation for the tolerance stack-up between the deployment system 20 and the device 22 (FIG. 2). The electrical connector 120 fits loosely within the block 122, allowing positional float in all three dimensions (vertically, and the two horizontal directions). Spring pins 126 (pins with springs around their shafts) are installed in the umbilical mounting block 122 to prevent the electrical connector 120 from disengaging with the mating connector on the device 22. The spring pins 126 also provide a positive positioning force that limits movement of the floating electrical connector 120 from vibrations. The pins of the spring pins 126 act as guide/retention features for the springs of the spring pins 126.

The deployment system 20 includes switches that indicate movement of certain parts of the deployment system 20. Activation of the secondary actuator 90 causes a change in the condition of an actuator switch 140, which may be used as a precondition for activation of the primary actuator 92. A lug latch switch 144 changes condition (e.g., activates or releases) when the release lug 42 is rotated for release of the device 22 (FIG. 2). A kicker feet switch 148 changes condition when the link bar 70 and the kicker feet 52 and 54 move, to signal that the kicker feet 52 and 54 have successfully been deployed to push the device 22 away from the deployment system 20.

The device 22 (FIG. 2) is loaded into the deployment system 22 by pulling back a release mechanism and a locking mechanism. The release mechanism and the locking mechanism are attached to the actuators 90 and 92. This pulls the actuators 90 and 92 back into a release position that allows the release lug 42 to drop down for engagement with the attachment lug of the device 22. The device 22 is pressed into position against the spring force urging the kicker feet 52 and 54 outward, until the locking actuators 90 and 92 engage the release latch 104. This holds the device 22 in place until both of the actuators 90 and 92 are released, as described above. The bolts 40 on the arms 34 then may be adjusted to prevent swaying of the device 22. Advantageously, no tools are required to secure the device 22 to the deployment system 20.

The launch (deployment) process for the device 22 (FIG. 2) begins with the deployment system 20 receiving a launch command, such as from the aircraft 10 (FIG. 1). The launch command may be sent remotely, or may be triggered by any of a variety of circumstances or conditions. The launch command triggers actuation of the secondary actuator 90. The compression of the secondary actuator 90 disengages the tooth 108 from the release latch 104, and changes condition of the actuator switch 140. This allows actuation of the primary actuator 92, which releases the release latch 104. The release latch 104 rotation allows disengagement of the release lug 42 from the corresponding attachment lug on the device, and release of the mechanism 32. The kicker feet 52 and 54 then push out the device 22 under the force of the kicker spring 74 and the link bar 70. The movement of the link bar 70 and the kicker feet 52 and 54 pushes the device 22 away from the deployment system 20, and changes condition of the kicker feet switch 148. This provides confirmation that the device 22 has separated from the deployment system 20.

In the separation process the electrical connector 120 separates from the mating electrical connector on the device 22 (FIG. 2). The electrical connector 120 advantageously has a vertical travel of some extent before separation from the mating electrical connector. This vertical travel allows momentum to be built up before the umbilical separation occurs. This may enhance reliability and repeatability in the separation process.

The deployment system 20 is able to handle any of a variety of devices 22 (FIG. 2), including devices 22 that are smart (able to receive signals through the electrical connector 120 or other means) or dumb (not able to be guided or receive signals). Any of a variety of different sizes, configurations, and/or proposed uses of devices 22 may be able to engage the deployment system 20. In addition, the deployment system 20 may have any of a wide variety of alternative configurations, for example using different numbers and/or configurations of actuators, kicker feet, and/or lugs.

The deployment system 20 described above provides many advantages with regard to prior deployment systems. The deployment system 20 receives any of a variety of devices, such as small munitions, have a standard coupling configuration, with or without electrical connection. The device 22 is advantageously deployed with a desired amount of pitch, for example with zero pitch.

The deployment system 20 described may alternatively have any of a variety of configurations, for example have different numbers of lugs, kicker feet, actuators, or switches. Also, there may be different configurations and/or interactions of these or any of a variety of other parts of the deployment system 20.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A deployment system for deploying a device from an aircraft during flight, the deployment system comprising:
   a pair of kicker feet;
   a spring-driven mechanical linkage operatively coupled to the kicker feet; and
   a release lug that selectively secures the device to the deployment system;
   wherein releasing the release lug causes the linkage to push the kicker feet contacting the device, and pushing the device away from the deployment system;
   wherein the release lug is operatively coupled to one or more actuators that must be actuated to release the release lug from securement with the device;
   wherein the one or more actuators includes a pair of actuators both of which must be actuated to release the release lug from securement with the device;
   wherein the pair of actuators include a primary actuator and a secondary actuator; and
   wherein actuating the secondary actuator changes condition of one or more actuator switches, thereby enabling actuation of the primary actuator.

2. The deployment system of claim 1, further comprising a lug latch switch that changes condition when the release lug is disengaged from the device, and makes contact with the lug latch switch.

3. The deployment system of claim 1, further comprising a kicker feet switch that changes condition when the kicker feet push the device away from the deployment system, and one or more of the kicker feet and the linkage make contact with the kicker feet switch.

4. The deployment system of claim 1, wherein the kicker feet are separated longitudinally from one another along a direction between a front of the deployment system to a back of the deployment system.

5. The deployment system of claim 1,
   further comprising:
   a body that encloses the mechanical linkage; and
   a floating electrical connector;
   wherein the floating electrical connector is mechanically coupled to the body, and positionally floats relative to the body; and
   wherein the floating electrical connector is able to positionally float relative to body in three orthogonal dimensions.

6. The deployment system of claim 1,
   in combination with the device;
   wherein the device is mechanically coupled to the deployment system.

7. The combination of claim 6, wherein the device is a munition that has a mass of 45 kg or less.

8. The deployment system of claim 1, in combination with an aircraft that the deployment system is mechanically coupled to.

9. The deployment system of claim 1, further comprising a kicker spring to move the cross-link bar longitudinally, along a direction between a front of the deployment system to a back of the deployment system, to rotate each of the kicker feet substantially in the same rotational direction, and thereby to push the device away from the deployment system.

10. The deployment system of claim 1, wherein the release lug is operatively coupled to one or more actuators that must be actuated to release the release lug from securement with the device.

11. The deployment system of claim 10, wherein the one or more actuators includes a pair of actuators both of which must be actuated to release the release lug from securement with the device.

12. The deployment system of claim 11, wherein actuation of the actuators rotate a latch that is mechanically coupled to the release lug, to release the release lug.

13. The deployment system of claim 11, wherein the actuators are electrical solenoid actuators.

14. The deployment system of claim 13, wherein the solenoid actuators are compressed to release the release lug.

15. The deployment system of claim 14, wherein compression of the solenoid actuators is against springs that are around parts of the solenoid actuators.

16. A deployment system for deploying a device from an aircraft during flight, the deployment system comprising:
   a pair of kicker feet;
   a spring-driven mechanical linkage operatively coupled to the kicker feet; and
   a release lug that selectively secures the device to the deployment system;

wherein releasing the release lug causes the linkage to push the kicker feet contacting the device, and pushing the device away from the deployment system; and wherein the kicker feet have rollers on their free ends that contact the device.

17. The deployment system of claim 16, wherein the release lug is operatively coupled to one or more actuators that must be actuated to release the release lug from securement with the device.

18. The deployment system of claim 17, wherein the one or more actuators includes a pair of actuators both of which must be actuated to release the release lug from securement with the device.

19. A deployment system for deploying a device from an aircraft during flight, the deployment system comprising:
 a pair of kicker feet;
 a spring-driven mechanical linkage operatively coupled to the kicker feet; and
 a release lug that selectively secures the device to the deployment system;

wherein releasing the release lug causes the linkage to push the kicker feet contacting the device, and pushing the device away from the deployment system; and wherein the linkage includes a cross-link bar having opposite ends directly rotatably journaled to respective of the kicker feet wherein the release lug is operatively coupled to one or more actuators that must be actuated to release the release lug from securement with the device;

wherein the one or more actuators includes a pair of actuators both of which must be actuated to release the release lug from securement with the device;

wherein the pair of actuators include a primary actuator and a secondary actuator; and wherein actuating the secondary actuator changes condition of one or more actuator switches, thereby enabling actuation of the primary actuator.

* * * * *